(12) United States Patent
Bocharov et al.

(10) Patent No.: US 8,909,806 B2
(45) Date of Patent: *Dec. 9, 2014

(54) DELIVERING CACHEABLE STREAMING MEDIA PRESENTATIONS

(75) Inventors: John A. Bocharov, Seattle, WA (US); Gegiang (Sam) Zhang, Redmond, WA (US); Krishna Prakash (Prakash) Duggaraju, Renton, WA (US); Sudheer Sirivara, Redmond, WA (US); Lin Liu, Sammamish, WA (US); Anirban Roy, Kirkland, WA (US); Jimin Gao, Seattle, WA (US); Jack E. Freelander, Monroe, WA (US); Christopher G. Knowlton, Redmond, WA (US); Vishal Sood, Bothell, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/405,220

(22) Filed: Mar. 16, 2009

(65) Prior Publication Data

US 2010/0235528 A1    Sep. 16, 2010

(51) Int. Cl.
*G06F 15/173* (2006.01)
*H04L 29/06* (2006.01)
*H04N 21/6437* (2011.01)
*H04L 29/08* (2006.01)

(52) U.S. Cl.
CPC ........ *H04L 65/4084* (2013.01); *H04N 21/6437* (2013.01); *H04L 67/2842* (2013.01); *H04L 65/607* (2013.01); *H04L 65/602* (2013.01); *H04L 67/2833* (2013.01); *H04L 65/1069* (2013.01); *H04L 65/4092* (2013.01); *H04L 65/608* (2013.01); *H04L 65/605* (2013.01)
USPC ....................................................... 709/231

(58) Field of Classification Search
USPC .................................. 709/230, 231, 232, 233
See application file for complete search history.

(56) References Cited

U.S. PATENT DOCUMENTS

| 6,252,873 B1 | 6/2001 | Vines |
| 6,728,763 B1 | 4/2004 | Chen |

(Continued)

FOREIGN PATENT DOCUMENTS

| CN | 1326637 A | 12/2001 |
| CN | 1478355 A | 2/2004 |

(Continued)

OTHER PUBLICATIONS

Girod, et al., "Advances in Channel-Adaptive Video Streaming", Proceedings of the 2002 International Conference on Image Processing, retrieved at <<http://www.stanford.edu/~bgirod/pdfs/GirodICIP02invited01.pdf>>, vol. 1, Sep. 2002, pp. 1-4.

(Continued)

*Primary Examiner* — Scott Christensen
(74) *Attorney, Agent, or Firm* — Ben Tabor; Kate Drakos; Micky Minhas

(57) ABSTRACT

A smooth streaming system provides a stateless protocol between a client and server in which the server embeds incremental control information in media fragments. The server provides uniform media fragment responses to media fragment requests that are cacheable by existing Internet cache infrastructure. The smooth streaming system receives media data in fragments from one or more encoders, creates an index of each fragment, and stores the fragments. The server provides fragments to clients that contain metadata information describing the encodings available on the server and the encoding of the fragment. The server may also provide information within each fragment that allows the client to determine whether the client is requesting data too fast or too slow, so that the client can adapt its request rate to a cadence in tune with the rate at which the server is receiving encoder data.

18 Claims, 5 Drawing Sheets

(56) References Cited

U.S. PATENT DOCUMENTS

| | | | |
|---|---|---|---|
| 7,054,911 | B1 | 5/2006 | Lango |
| 7,412,531 | B1 | 8/2008 | Lango et al. |
| 7,617,178 | B2 | 11/2009 | Chavez |
| 7,624,417 | B2 | 11/2009 | Dua |
| 7,644,108 | B1* | 1/2010 | Malmskog ............. 709/203 |
| 7,886,069 | B2 | 2/2011 | Osborne |
| 2002/0047899 | A1 | 4/2002 | Son |
| 2002/0071485 | A1 | 6/2002 | Caglar |
| 2002/0154691 | A1 | 10/2002 | Kost |
| 2003/0110299 | A1 | 6/2003 | Larsson |
| 2004/0117427 | A1 | 6/2004 | Allen et al. |
| 2004/0199565 | A1 | 10/2004 | Visharam et al. |
| 2005/0102371 | A1 | 5/2005 | Aksu |
| 2005/0135476 | A1 | 6/2005 | Gentric |
| 2005/0234892 | A1* | 10/2005 | Tamura ..................... 707/3 |
| 2005/0283535 | A1 | 12/2005 | Covell |
| 2006/0041679 | A1 | 2/2006 | Feig |
| 2006/0161635 | A1* | 7/2006 | Lamkin et al. ............ 709/217 |
| 2006/0224760 | A1 | 10/2006 | Yu et al. |
| 2006/0245367 | A1 | 11/2006 | Jeffery |
| 2007/0083762 | A1 | 4/2007 | Martinez |
| 2007/0143807 | A1 | 6/2007 | Suneya |
| 2008/0086570 | A1 | 4/2008 | Dey |
| 2008/0133767 | A1 | 6/2008 | Birrer et al. |
| 2008/0168516 | A1 | 7/2008 | Flick |
| 2008/0178230 | A1 | 7/2008 | Eyal |
| 2008/0195743 | A1 | 8/2008 | Brueck |
| 2008/0235331 | A1 | 9/2008 | Melamed |
| 2008/0243996 | A1 | 10/2008 | Wu |
| 2008/0307105 | A1 | 12/2008 | Sethi et al. |
| 2009/0019176 | A1 | 1/2009 | Debrosse |
| 2009/0185074 | A1 | 7/2009 | Streijl |
| 2010/0123830 | A1 | 5/2010 | Vunic |
| 2011/0080940 | A1 | 4/2011 | Bocharov |

FOREIGN PATENT DOCUMENTS

| | | | |
|---|---|---|---|
| CN | 1625880 | A | 6/2005 |
| CN | 1795641 | A | 6/2006 |
| CN | 1902865 | A | 1/2007 |
| KR | 100410973 | B1 | 12/2003 |
| KR | 100859705 | B1 | 9/2008 |
| WO | 2008086313 | A1 | 7/2008 |

OTHER PUBLICATIONS

Schulzrinne, et al., "Real Time Streaming Protocol (RTSP) draft-ietf-mmusic-rtsp-01.txt", Internet Draft, retrieved at <<http://tools.ietf.org/html/draft-ietf-mmusic-rtsp-01>>, Feb. 24, 2007, pp. 1-59.
Hoch, Michael., "Ramp Rate", "Simplifying the Recording and Streaming of Rich Media Presentations: A White Paper", retrieved at <<http://www.infocomm.org/cps/rde/xbcr/infocomm/Simplifying_the_Recording_and_Streaming_of_Rich_Media_Presentations.pdf>>, Oct. 15, 2004, pp. 1-7.
Chang, et al., "Real-Time Content-Based Adaptive Streaming of Sports Videos", Proceedings of the IEEE Workshop on Content-based Access of Image and Video Libraries, retrieved at <<http://ieeexplore.ieee.org/stamp/stamp.jsp?arnumber=990868&isnumber=21352>>, Mar. 9, 2009, pp. 139-146.
Conklin, et al., "Video Coding for Streaming Media Delivery on the Internet", IEEE Transactions on Circuits and Systems for Video Technology, retrieved at <<http://ieeexplore.ieee.org/ielx5/76/19666/00911155.pdf?arnumber=911155>>, vol. 11, No. 3, pp. 269-281.
"International Search Report", Mailed Date: Sep. 27, 2010, Application No. PCT/US2010/026710, Filed Date: Mar. 9, 2010, pp. 10.
Chinese Patent Application No. 2010080012748.3, First Office Action dated Oct. 29, 2012, 11 pages (including English Translation).
Chinese Patent Application No. 20100800127483, Response to First Office Action dated Feb. 28, 2013, 14 pages (including English Translation of claims).

Chinese Patent Application No. 2010080012748.3, Second Office Action dated Jul. 11, 2013, 6 pages (including English Translation).
English translation of Abstract of CN1326637, 1 page.
English translation of Abstract of CN1902865, 1 page.
European Patent Application No. EP 10 75 3888, Extended European Search Report dated Nov. 16, 2012, 7 pages.
European Patent Application No. EP 10 75 3888, Response to Extended European Search Report dated Feb. 15, 2013, 19 pages.
U.S. Appl. No. 12/611,133, Amendment dated Feb. 28, 2013, 15 pages.
U.S. Appl. No. 12/611,133, Final Office Action dated Aug. 29, 2013, 12 pages.
U.S. Appl. No. 12/611,133, Amendment dated Apr. 23, 2012, 12 pages.
U.S. Appl. No. 12/611,133, Office Action dated Dec. 22, 2011, 10 pages.
Birney, Bill, "Streaming from a Web Server", retrieved at <<http://www.microsoft.com/windows/windowsmedia/howto/articles/webserver.aspx>>, Jun. 2003, pp. 5.
Rejaie, et al., "Proxy Caching Mechanism for Multimedia Playback Streams in the Internet", retrieved at <<http://research.cens.ucla.edu/people/estrin/resources/conferences/1999apr-Rejaie-Estrin-Proxy.pdf>>, Apr. 16, 1999, pp. 11.
Wu, et al., "Streaming Video over the Internet: Approaches and Directions", retrieved at <<http://people.cs.ubc.ca/ - krasic/cpsc538a-2005/papers/wustreaming.pdf>>, Mar. 2001, pp. 282-300.
Hsueh, et al., "A Packet-Based Caching Proxy with Loss Recovery for Video Streaming", retrieved at <<http://ieeexplore.ieee.org/stamp/stamp.jsp?tp=&arnumber=1185637 &isnumber=26604>>, 2002, pp. 6.
Nelson, David, "Windows Media Server or Web Server?", retrieved at <<http://learn.iis.neUpage.aspx/454/windows- media-server-or-web-server/>>, May 15, 2008, pp. 9.
"HTTP Streaming", retrieved at <<http://www.peerapp.comIData/Files/HTTP Video_Streaming_Solution_Brief.pdf>>, Sep. 25, 2009, pp. 1-6.
"International Search Report", Mailed Date: Jun. 20, 2011, Application No. PCT/US2010/051695, Filed Date: Oct. 6, 2010, pp. 11.
European Patent Application No. EP 10 82 2639, Extended European Search Report dated Feb. 26, 2013, 7 pages.
European Patent Application No. EP 10 82 2639, Response Extended European Search Report dated Aug. 5, 2013, 14 pages.
U.S. Appl. No. 61/249,257, filed Oct. 6, 2009, 41 pages.
Zambelli, Alex, Microsoft Corporation, "IIS Smooth Streaming Technical Overview", Mar. 2009, 18 pages.
Huawei Technologies Co., Ltd., "Storage for HTTP Streaming", Aug. 2009, 6 pages.
Chinese Patent Application No. 2010080012748.3, Response to Office Action dated Sep. 13, 2013, 12 pages (including English Translation of claims).
Chinese Patent Application No. 2010080012748.3, Office Action dated Oct. 31, 2013, 7 pages (including English Translation).
Chinese Patent Application No. 2010080012748.3, Amendment dated Jan. 7, 2014, 5 pages (including English summary).
U.S. Appl. No. 12/611,133, Notice of Allowance dated Nov. 12, 2013, 9 pages.
Chinese Patent Application No. 201080045546.9, Office Action dated Dec. 17, 2013, 13 pages (including English translation).
English translation of abstract of CN1478355, 1 page, Feb. 25, 2004.
Chinese Patent Application No. 2010080012748.3, Office Action dated Feb. 12, 2014, 8 pages (including English Translation).
Chinese Patent Application No. 2010080012748.3, Amendment dated Apr. 23, 2014, 17 pages (including English summary).
U.S. Appl. No. 12/611,133, Petition to Withdraw from Issue and RCE dated Feb. 28, 2014, 10 pages.
"Office Action Issued in Chinese Patent Application No. 201080012748.3", Mailed Date: Jun. 13, 2014, Filed Date: Mar. 9, 2010, 11 Pages.

* cited by examiner

DELIVERING CACHEABLE STREAMING MEDIA PRESENTATIONS

BACKGROUND

Streaming media is multimedia that is constantly received by, and normally presented to, an end-user (using a client) while it is being delivered by a streaming provider (using a server). Several protocols exist for streaming media, including the Real-time Streaming Protocol (RTSP), Real-time Transport Protocol (RTP), and the Real-time Transport Control Protocol (RTCP), which are often used together. The Real Time Streaming Protocol (RTSP), developed by the Internet Engineering Task Force (IETF) and created in 1998 as Request For Comments (RFC) 2326, is a protocol for use in streaming media systems, which allows a client to remotely control a streaming media server, issuing VCR-like commands such as "play" and "pause", and allowing time-based access to files on a server.

The sending of streaming data itself is not part of the RTSP protocol. Most RTSP servers use the standards-based RTP as the transport protocol for the actual audio/video data, acting somewhat as a metadata channel. RTP defines a standardized packet format for delivering audio and video over the Internet. RTP was developed by the Audio-Video Transport Working Group of the IETF and first published in 1996 as RFC 1889, and superseded by RFC 3550 in 2003. The protocol is similar in syntax and operation to Hypertext Transport Protocol (HTTP), but RTSP adds new requests. While HTTP is stateless, RTSP is a stateful protocol. A session ID is used to keep track of sessions when needed. RTSP messages are sent from client to server, although some exceptions exist where the server will send messages to the client.

RTP is usually used in conjunction with RTCP. While RTP carries the media streams (e.g., audio and video) or out-of-band signaling (dual-tone multi-frequency (DTMF)), RTCP is used to monitor transmission statistics and quality of service (QoS) information. RTP allows only one type of message, one that carries data from the source to the destination. In many cases, there is a use for other messages in a session. These messages control the flow and quality of data and allow the recipient to send feedback to the source or sources. RTCP is a protocol designed for this purpose. RTCP has five types of messages: sender report, receiver report, source description message, bye message, and application-specific message. RTCP provides out-of-band control information for an RTP flow. RTCP partners with RTP in the delivery and packaging of multimedia data, but does not transport any data itself. It is used periodically to transmit control packets to participants in a streaming multimedia session. One function of RTCP is to provide feedback on the quality of service being provided by RTP. RTCP gathers statistics on a media connection and information such as bytes sent, packets sent, lost packets, jitter, feedback, and round trip delay. An application may use this information to increase the quality of service, perhaps by limiting flow or using a different codec or bit rate.

One problem with existing media streaming architectures is the tight coupling between server and client. The stateful connection between client and server creates additional server overhead, because the server tracks the current state of each client. This also limits the scalability of the server. In addition, the client cannot quickly react to changing conditions, such as increased packet loss, reduced bandwidth, user requests for different content or to modify the existing content (e.g., speed up or rewind), and so forth, without first communicating with the server and waiting for the server to adapt and respond. Often, when a client reports a lower available bandwidth (e.g., through RTCP), the server does not adapt quickly enough causing breaks in the media to be noticed by the user on the client as packets that exceed the available bandwidth are not received and new lower bit rate packets are not sent from the server in time. To avoid these problems, clients often buffer data, but buffering introduces latency, which for live events may be unacceptable.

In addition, the Internet contains many types of downloadable media content items, including audio, video, documents, and so forth. These content items are often very large, such as video in the hundreds of megabytes. Users often retrieve documents over the Internet using HTTP through a web browser. The Internet has built up a large infrastructure of routers and proxies that are effective at caching data for HTTP. Servers can provide cached data to clients with less delay and by using fewer resources than re-requesting the content from the original source. For example, a user in New York may download a content item served from a host in Japan, and receive the content item through a router in California. If a user in New Jersey requests the same file, the router in California may be able to provide the content item without again requesting the data from the host in Japan. This reduces the network traffic over possibly strained routes, and allows the user in New Jersey to receive the content item with less latency.

Unfortunately, live media often cannot be cached using existing protocols, and each client requests the media from the same server or set of servers. In addition, when streaming media can be cached, it is often done by specialized cache hardware, not existing and readily available HTTP-based Internet caching infrastructure. The lack of caching limits the number of parallel viewers and requests that the servers can handle, and limits the attendance of a live event. The world is increasingly using the Internet to consume up to the minute live information, such as the record number of users that watched live events such as the opening of the 2008 Olympics via the Internet. The limitations of current technology are slowing adoption of the Internet as a medium for consuming this type of media content.

SUMMARY

A smooth streaming system is described herein that provides a stateless protocol between the client and server in which the server embeds incremental information in media fragments that eliminates the usage of a typical control channel. In addition, the server provides uniform media fragment responses to media fragment requests, thereby allowing existing Internet cache infrastructure to cache streaming media data. The smooth streaming system receives media data in fragments from one or more encoders, creates an index of each fragment, and stores the fragments. As the event progresses, the server provides fragments requested by clients until the end of the event. Each fragment contains metadata information that describes the encodings available on the server and the encoding of the fragment in addition to the media content of the fragment for playback by the client. The server may provide fragments in multiple encodings so that the client can, for example, switch quickly to fragments of a different bit rate or playback speed based on network conditions. The server may also provide information within each fragment that allows the client to determine whether the client is requesting data too fast or too slow, so that the client can adapt its request rate to a cadence in tune with the rate at which the server is receiving encoder data. Thus, the smooth streaming system provides a more scalable streaming media server without tracking client state and with an increased likelihood that clients will receive media with lower latency from a cache server local to the client.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
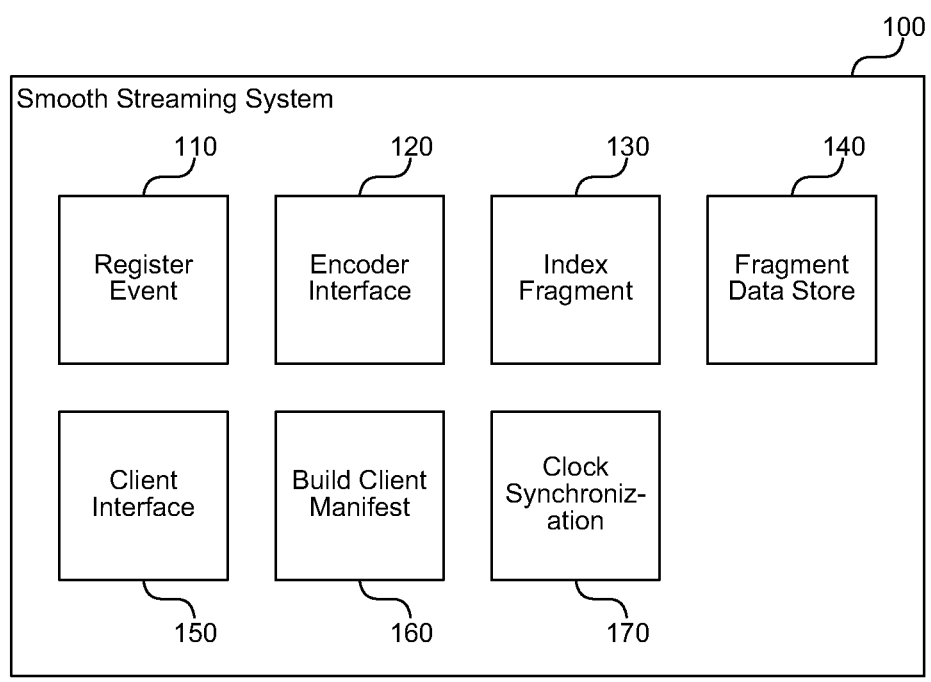
FIG. 1 is a block diagram that illustrates components of the smooth streaming system, in one embodiment.

A smooth streaming system is described herein that provides a stateless protocol between the client and server in which the server embeds incremental information in media fragments (i.e., chunks) that eliminates the usage of a typical control channel. In addition, the server provides uniform media fragment responses to media fragment requests (i.e., clients requesting the same fragment get the same response), thereby allowing existing Internet cache infrastructure to cache streaming media data. Each fragment has a distinguished Uniform Resource Locator (URL) that allows the fragment to be identified and cached by both Internet cache servers and the client's browser cache. Caching reduces the load on the server and allows more clients to view the same content at the same time. The smooth streaming system receives media data in fragments from one or more encoders, creates an index of each fragment, and stores the fragments. As the event progresses, the server provides fragments requested by clients until the end of the event. Each fragment contains metadata information that describes the encodings available on the server and the encoding of the fragment in addition to the media content of the fragment for playback by the client. The server may provide fragments in multiple encodings so that the client can, for example, switch quickly to fragments of a different bit rate or playback speed based on network conditions. The server may also provide information within each fragment that allows the client to determine whether the client is requesting data too fast or too slow, so that the client can adapt its request rate to a cadence in tune with the rate at which the server is receiving encoder data. Thus, the smooth streaming system provides a more scalable streaming media server without tracking client state and with an increased likelihood that clients will receive media with lower latency from a cache server local to the client.

In some embodiments, the smooth streaming system uses a particular data transmission format between the server and client. The client requests fragments of media from a server that include a portion of the media. For example, for a 10-minute file, the client may request 2-second fragments.

Note that unlike typical streaming where the server pushes data to the client, in this case the client pulls media fragments from the server. In the case of a live stream, the server may be creating the media on the fly and producing fragments to respond to client requests. Thus, the client may only be several fragments behind the server in terms of how fast the server creates fragments and how fast the client requests fragments.

Each fragment contains metadata and media content. The metadata may describe useful information about the media content, such as the bit rate at which the media content was encoded, where the media content fits into a larger media element (e.g., this fragment represents offset 1:10 in a 10 minute video clip), the codec used to encode the media content, and so forth. The client uses this information to place the fragment into a storyboard of the larger media element and to properly decode and playback the media content.

FIG. 1 is a block diagram that illustrates components of the smooth streaming system, in one embodiment. The smooth streaming system 100 includes a register event component 110, an encoder interface component 120, an index fragment component 130, a fragment data store 140, a client interface component 150, a build client manifest component 160, and a clock synchronization component 170. Each of these components is described in further detail herein.

The register event component 110 receives information about a live or other media event for which the system will receive encoded media data. The information may include network address information or other identifiers for each of the encoders that will supply encoded media data to the server. The information also includes a URL to which encoders will supply encoded media data and at which clients can access the media data.

The encoder interface component 120 provides an interface between the system and one or more encoders that provide the encoded media data. The encoders may push data to the system using common network protocols. For example, the encoders may use an HTTP POST request to provide encoded media data to the system. The encoders may each use a distinguished URL that specifies the encoder that is the source of the encoded media data, which the server may match to the information received by the register event component 110 when the media event was registered.

The encoder interface component 120 may specify a particular format for received encoded media data, such as an MP4 or other media container (e.g., MKV). The MP4 container format allows multiple types of data to be associated in a single file. The individual data that makes up an MP4 container is called a box, and each box typically has a label that identifies the type of data stored in the box. Encoders may place metadata information in the boxes such as the type of encoding used to encode the encoded media data, as well as the encoded media data itself.

The index fragment component 130 creates and maintains an index table of fragments received from various encoders. Because the system 100 is receiving media fragments on an on-going basis during an event from potentially many encoders, the system 100 uses the index table to keep track of what media fragments have been received and from which encoders (or in which formats). Each encoder may use a common method for identifying media fragments (e.g., a time stamp using a synchronized clock) so that the index fragment component 130 can correlate fragments from different encoders that represent the same period in a live event. In this way, the system 100 can detect when media fragments are missing and can provide clients with manifest information about available media fragments.

The fragment data store 140 stores received media fragments and the created index table of fragments to provide to clients based on received client requests. The fragment data store may include a database, disk drive, or other form of data storage (e.g., a Storage Area Network (SAN) or even a cloud-based storage service).

The client interface component 150 receives client requests for media fragments and provides manifest data and media fragments to clients. When a client initially connects to the system 100, the client may send a request for a client manifest. The client interface component 150 invokes the build client manifest component 160 to create a manifest that includes information about the encodings available from the system 100, and fragments stored by the system 100 up to the current time based on the index table. The client can use this information either to begin requesting ongoing live fragments, or to skip backwards in time to earlier portions of a presentation. This can be used, for example, if the client joins a live event that is already in progress and wants to catch up with the previous portions of the event.

The build client manifest component 160 builds a manifest to satisfy a client request that includes information about each of the encodings available from the system 100 and fragments stored by the system up to the current time. The build client manifest component 160 also provides a manifest to include with each media fragment that provides information to the client about the current media fragment as well as potentially subsequent fragments. By combining the initially received manifest with subsequent manifests provided with each media fragment, the client can build an up to date manifest that includes complete information about the media event from the start up until the current time. When the media event completes, the client has a complete storyboard of the media event that the client can use for on-demand viewing of the media event.

In some embodiments, the client interface component 150 responds to client requests in a way that encourages clients to make requests a certain amount of time after media fragments are available. For example, the system 100 may not responds with a particular media fragment until the system 100 has received one or more subsequent fragments from the encoders. This allows the system 100 to include manifest information about the subsequent fragments in the current fragment response. The system 100 may also provide the client with a count of subsequent fragment that the client can expect with each media fragment. This becomes a timing hint for the client. If the client receives a media fragment with information about fewer subsequent fragments than the provided count, then the client can assume that the client is requesting data from the server too quickly. On the other hand, if the client receives a media fragment with information about more subsequent fragments than the provided count, then the client can assume that the client is requesting data from the server too slowly. Thus, in response to any particular fragment request, build manifest component 160 provides manifest information about as many subsequent fragments as the system 100 has received up to that point.

The clock synchronization component 170 synchronizes the clocks of the system 100, clients, and encoders. Although absolute time is not relevant to the system 100, being able to identify a particular fragment across multiple encoders and providing clients with the rate (i.e. cadence) at which to request fragments is relevant to the system 100. For example, if the client requests data too quickly, the server will not yet have the data and will respond with error responses (e.g., an HTTP 404 not found error response) creating many spurious requests that unnecessarily consume bandwidth. On the other hand, if the client requests data too slowly, then the client may not have data in time for playback creating noticeable breaks in the media played back to the user. In addition, encoders produce media fragments in encodings that may differ dramatically and provide no meaningful way of correlating two fragments that represent the same period of time in different encodings as well as where the fragments fit into an overall timeline of the media event. The clock synchronization component 170 provides this information by allowing the server, encoders, and clients to have a similar clock value at a particular time. The encoders may also mark each media fragment with the time at which the encoder created the fragment. In this way, if a client requests a particular fragment, the client will get a fragment representing the same period regardless of the encoding that the client selects.

The computing device on which the smooth streaming system is implemented may include a central processing unit, memory, input devices (e.g., keyboard and pointing devices), output devices (e.g., display devices), and storage devices (e.g., disk drives or other non-volatile storage media). The memory and storage devices are computer-readable storage media that may be encoded with computer-executable instructions (e.g., software) that implement or enable the system. In addition, the data structures and message structures may be stored or transmitted via a data transmission medium, such as a signal on a communication link. Various communication links may be used, such as the Internet, a local area network, a wide area network, a point-to-point dial-up connection, a cell phone network, and so on.

Embodiments of the system may be implemented in various operating environments that include personal computers, server computers, handheld or laptop devices, multiprocessor systems, microprocessor-based systems, programmable consumer electronics, digital cameras, network PCs, minicomputers, mainframe computers, distributed computing environments that include any of the above systems or devices, and so on. The computer systems may be cell phones, personal digital assistants, smart phones, personal computers, programmable consumer electronics, digital cameras, and so on.

The system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments.

As discussed above, the build client manifest component creates a client manifest. Following is an example of a typical client manifest.

```
<?xml version="1.0" encoding="utf-8"?>
<!--Created with Expression Encoder version 2.1.1205.0-->
<SmoothStreamingMedia MajorVersion="1" MinorVersion="0"
    Duration="6537916781"
    LookAheadFragmentCount="3" IsLive="TRUE">
  <StreamIndex Type="video" Subtype="WVC1" Chunks="327"
      Url="QualityLevels({bitrate})/Fragments(video={start time})">
    <QualityLevel Bitrate="1450000" FourCC="WVC1" Width="848"
      Height="480" CodecPrivateData=". . ." />
    <QualityLevel Bitrate="1050000" FourCC="WVC1" Width="592"
      Height="336" CodecPrivateData=". . ." />
    <c n="0" t="12345678" d="20000000" />
    <c n="1" t="32345678" d="20000000" />
    <c n="2" t="52345678" d="20000000" />
    <c n="3" t="72345678" d="20000000" />
  </StreamIndex>
</SmoothStreamingMedia>
```

The client manifest lists the decoding information as well as information for all the fragments that the server has archived so far. The total media fragment number and duration is only for the media fragments that the server has archived up until when the client makes the request (this allows the client to quickly build the seek bar). For each media fragment, "t" means the absolute timestamp. The client uses this value to compose the fragment URL (e.g., "Fragments (video={start time})"). LookAheadFragmentCount indicates the targeted number of subsequent fragments that "TrackFragmentReferenceBox" is going to reference as described further herein. "IsLive" indicates whether the live broadcast is still going on.

In some embodiments, when a client requests a particular media fragment the smooth streaming system provides information about subsequent media fragments. For example, the server may hold a particular fragment that is ready until some number of additional fragments (e.g., two fragments) is available. Then, the server may send the fragment along with manifest information about the next few fragments. The client can use this information to know what is coming and adapt appropriately. This allows the client to intelligently adjust the request rate. For example, if a client requests a fragment and does not have any information about later fragments, then the client knows it is requesting data too fast. If the client requests a fragment and receives information about too many later fragments, then the client may be requesting information too slow. Thus, the client can adapt using the advance metadata as a hint.

The information about subsequent media fragments may be stored in an MP4 container using a custom box. For example, the server may insert a "TrackFragmentReferenceBox" into the 'traf' box shown above with the definition below:

```
Box Type: 'uuid', {d4807ef2-ca39-4695-8e54-26cb9e46a79f}
Container: 'traf'
Mandatory: Yes
Quantity: Exactly one
aligned(8) class TrackFragmentReferenceBox
extends Box('uuid', {d4807ef2-ca39-4695-8e54-26cb9e46a79f })
{
    unsigned int(8) version;
    bit(24) flags = 0;
    unsigned int (8) fragment_count;
    for(i=1; i * fragment_count; i++){
        if(version==1) {
            unsigned int(64) fragment_absolute_time;
            unsigned int(64) fragment_duration;
        } else {
            unsigned int(32) fragment_absolute_time;
            unsigned int(32) fragment_duration;
        }
    }
}
```

The fragment_count specifies the number of immediate subsequent fragments of the same track that this box is referencing. The fragments are listed in the same order as they appear in the MP4 stream. This number is equal or greater than 1. The fragment_absolute_time specifies a 32- or 64-bit integer that indicates the absolute timestamp of the first sample in the subsequent fragment. The fragment_duration specifies a 32- or 64-bit integer that indicates the duration of the subsequent fragment. The number of subsequent fragments in "TrackFragmentReferenceBox" box (as in 'fragment_count') is a configurable setting on the server. When the server receives a fragment request, if the server has enough subsequent fragments as the configured value to fill the "TrackFragmentReferenceBox", the server can follow the normal response handling code path with default cache control settings.

If instead the server has at least one but not enough subsequent fragments to fill the "TrackFragmentReferenceBox", the server may still return the fragment response right away with the limited subsequent fragment's information. The server may set a small cache timeout value (depending on the fragment duration) and expect to update the response with full "TrackFragmentReferenceBox" for future requests. The low amount of subsequent fragment information is a hint to the client that the client is requesting data too quickly. If the server does not have any subsequent fragment for this track, it can fail the request with a particular error code indicating "fragment temporarily out of range". The error response can be cacheable for a small time window. Clients detect this error and retry the same request after a small delay. One exception is the case when a live session has stopped and the server is about to serve out the very last fragment, in which case there will not be any subsequent fragment information, and the server responds to the request with the final stream fragments.

Figure 2:
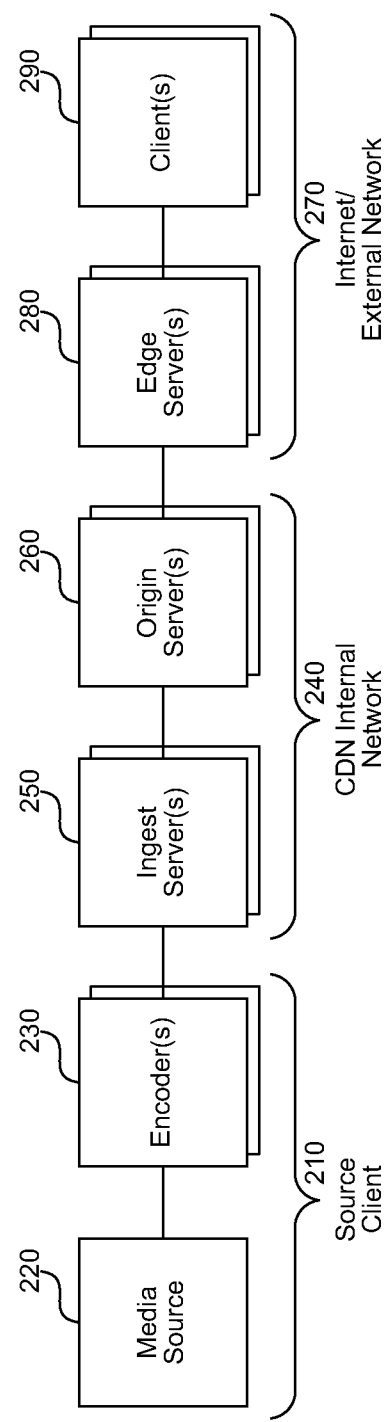
FIG. 2 is a block diagram that illustrates an operating environment of the smooth streaming system using Microsoft Windows and Microsoft Internet Information Server (IIS), in one embodiment.

FIG. 2 is a block diagram that illustrates an operating environment of the smooth streaming system using Microsoft Windows and Microsoft Internet Information Server (IIS), in one embodiment. The environment typically includes a source client 210, a content delivery network 240, and an external network 270. The source client is the source of the media or live event. The source client includes a media source 220 and one or more encoders 230. The media source 220 may include cameras each providing multiple camera angles, microphones capture audio, slide presentations, text (such as from a closed captioning service), images, and other types of media. The encoders 230 encode the data from the media source 220 in one or more encoding formats in parallel. For example, the encoders 230 may produce encoded media in a variety of bit rates.

The content delivery network 240, where the smooth streaming system operates, includes one or more ingest servers 250 and one or more origin servers 260. The ingest servers 250 receive encoded media in each of the encoding formats from the encoders 230 and create a manifest describing the encoded media. The ingest servers 250 may create and store the media fragments described herein or may create the fragments on the fly as they are requested. The ingest servers 250 can receive pushed data, such as via an HTTP POST, from the encoders 230, or via pull by requesting data from the encoders 230. The encoders 230 and ingest servers 250 may be connected in a variety of redundant configurations. For example, each encoder may send encoded media data to each of the ingest servers 250, or only to one ingest server until a failure occurs. The origin servers 260 are the servers that respond to client requests for media fragments. The origin servers 260 may also be configured in a variety of redundant configurations.

In some embodiments, the ingest servers 250 comprise one or more servers dedicated to ingesting encoder media streams. An administrator or content author may create a publishing point that defines a URL at which clients of the ingest servers 250 can find a particular media element (e.g., a live event). For example, using IIS, the administrator may publish a URL "http://ingserver/pubpoint.isml." The publishing point is used by the encoders 230 to provide new media data to the ingest servers 250 and by the origin servers 260 to request media data from the ingest servers 250. Each encoder may use a distinguished URL to connect to the ingest servers 250 so that the ingest servers 250 can detect different encodings of the same data. For example, based on the URL in the previous example, an encoder may send an HTTP POST to provide media data to the ingest server using the URL "http://ingserver/pubpoint.isml/Streams(stream1)." The ingest servers 250 store the received data for later retrieval by clients of the ingest servers 250 (e.g., the origin servers 260). The POST may contain various types of media formats, such as an MP4 container. An MP4 container contains various types of information, called boxes, that are typically labeled with a four-letter code, such as "ftyp" to describe the type of encoding used and "moov" to contain audiovisual data. Whether using MP4 or other container formats, the encoder may add additional boxes or information to the stream, such as a "ManifestBox" that contains a manifest describing the media element.

When the ingest servers 250 receive a request for data, the ingest servers 250 provide the data stored earlier. The ingest servers 250 may support several types of requests, including a request for encoder stream manifest that identifies the available encoder streams and a request for data from a specific stream (including portions of the stream data). The type of request may be identified by the URL of the request. For example, when the ingest servers 250 receive the URL "http://ingserver/pubpoint.isml/StreamManifest," the ingest servers 250 return an encoder manifest that contains identifiers for each available encoder. When the ingest servers 250 receives the URL "http://ingserver/pubpoint.isml/Streams(stream1)," the ingest servers 250 send a corresponding media stream for the encoder associated with the identifier "Encoder1" in response. The response may include the MP4 data, such as the cached "ftyp," "ManifestBox," and "moov" boxes described above followed by media fragments in a FIFO buffer. The ingest servers 250 may also receive partial data requests (e.g., during failover scenarios) of the form "http://ingserver/pubpoint.isml/Streams(stream1)/StartTime(12345678)," that cause the ingest servers 250 to skip sending "ftyp," "ManifestBox," and "moov" boxes and to try to start from the media fragment that is closest to the specified timestamp.

The origin servers 260 receive requests for media streams from media clients and retrieve requested media streams from one or more ingest servers 250. Like the ingest servers 250, an administrator or content author registers a publishing point on the origin server, and then associates the ingest servers 250 and/or encoder URLs with the publishing point. The origin servers 260 may first request (e.g., using an HTTP GET request) a manifest from the ingest servers 250 that describes the available streams. The origin server then submits separate requests for each encoder stream to the ingest server, and the ingest server responds with the requested media stream as received from the encoder.

The origin servers 260 may separately receive manifest information about the media stream and media fragments that represent parts of a larger media element being provided by the media stream. The origin servers 260 build an index of each fragment received from each stream based on a timestamp or other identifier provided by each encoder that allows the origin servers 260 to correlate data from each encoder. The origin servers 260 may build their own MP4 container or other storage format from the received data from which to respond to media client requests. By building a file of a known format from a live event, the origin server may be able to provide a unified download of a media file quickly after the event.

When the origin servers 260 receive a media client request, the origin servers 260 generate a client manifest by appending the index that the server has built to the static stream information received from the encoder manifest(s). If there are multiple streams, then the origin servers 260 merge the stream manifests into a comprehensive client manifest. This allows the client to be selective in which encoding type the client requests without obtaining further information from the origin servers 260. The server provides the manifest to the client using a standard response type that can be cached by existing Internet infrastructure, such as an HTTP response. Because the manifest data may change over time, the server may set a short cache timeout value (e.g., time to live (TTL)) on the manifest response.

The external network 270 includes edge servers 280 and other Internet (or other network) infrastructure and clients 290. When a client makes a request for a media fragment, the client addresses the request to the origin servers 260. Because of the design of network caching, if one of the edge servers 280 contains the data, then that edge server may respond to the client without passing along the request. However, if the data is not available at the edge server, then the edge server forwards the request to one of the origin servers 260. Likewise, if one of the origin servers 260 receives a request for data that is not available, the origin server may request the data from one of the ingest servers 250.

Figure 3:
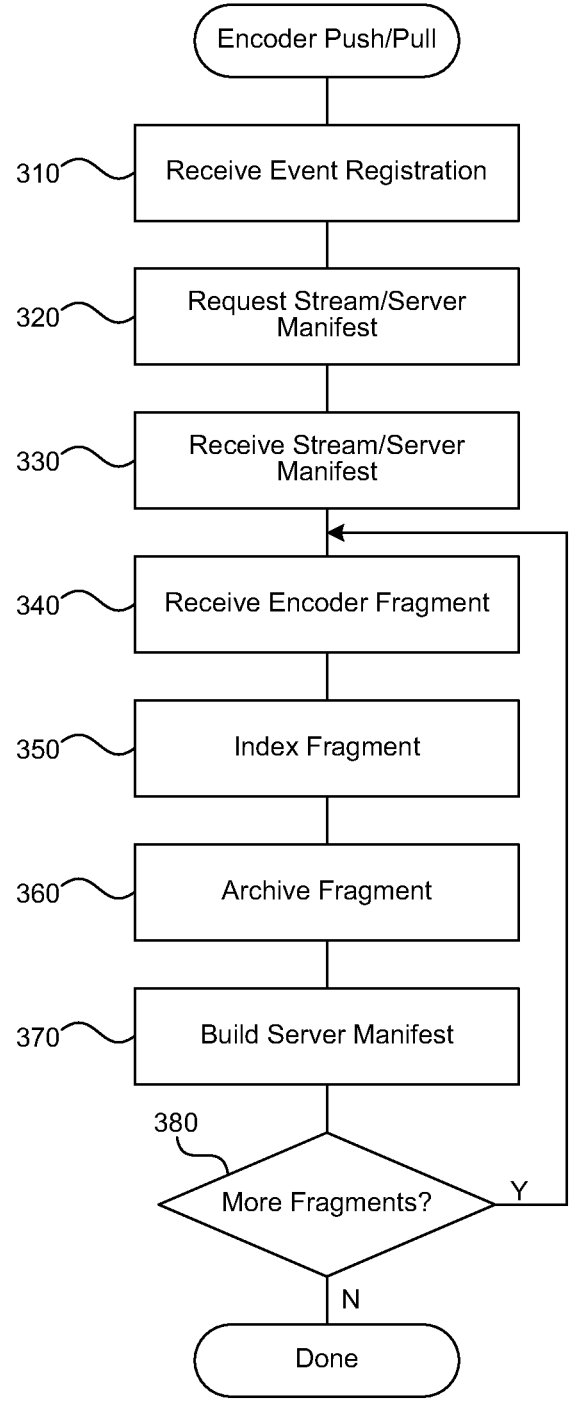
FIG. 3 is a flow diagram that illustrates the processing of the system to receive media data from encoders, in one embodiment.

FIG. 3 is a flow diagram that illustrates the processing of the system to receive media data from encoders, in one embodiment. Beginning in block 310, the system receives an event registration that describes a media event for which the system will receive media data from one or more encoders. For example, the event registration may include an identification of each encoder, a description of the media event, and a URL to which encoders will provide encoded media data. Continuing in block 320, the system parses the incoming stream to obtain the stream manifest, which describes all the encoder streams the system can expect, and the server manifest that describes the media data available for the stream in which it appears." The system can operate using a pull or a push model. For example, the system may send an HTTP GET request to the encoder requesting the encoder's configuration information, or the system may simply receive this information from the encoder as part of the stream.

In the "push" (e.g. encoder POST) case, both manifests are embedded at the beginning of the stream in custom boxes, so there is no request to make, and the system can parse the manifests out. In the "pull" case (e.g. server GET), the stream manifest is inapplicable (the publishing point definition contains equivalent information), and the system embeds that information as a custom box. The stream manifest is used to specify the set of streams that the server acquires from the encoder before presenting any data to downstream servers and client. Without the stream manifest, a race condition exists in which the server has acquired some but not all of the encoder streams, and a downstream server or client gets an incomplete picture. The system is "self-managing" in the sense that the server administrator does not specify what streams to expect, because each incoming encoder stream contains a stream manifest that provides this information.

Continuing in block 330, the system receives an encoder manifest from each encoder. The system merges the manifests of the encoders together and stores the merged manifest for later retrieval by clients interested in knowing the media encodings that the system can provide. Continuing in block 340, the system receives a media fragment from an encoder. The media fragment may include a timestamp, an identifier of the encoder that encoded the media fragment, and other information about the media fragment. An encoder identifier is not typically used because the system knows what stream the fragment came in over, and has identifying information on which encoder generated the stream beyond the stream identifier. Continuing in block 350, the system indexes the received media fragment and adds the index information to an index table maintained by the system that catalogs the available media fragments from the system. The system may use the timestamp associated with the media fragment to correlate media fragments produced in parallel by different encoders.

Continuing in block 360, the system archives the fragment by storing the fragment and index information in a data store from which the fragment and index information can later be retrieved to satisfy client requests. Continuing in block 370, the system builds a server manifest that includes information about a media event of which the media fragments are a part by adding information about the received fragment to the manifest. The server provides this manifest to clients when the clients connect to give the clients information about the then existing media fragments available from the system. When the event completes, the server manifest contains a complete description of the media event that can be provided to clients for on-demand viewing of the media event. Continuing in decision block 380, if the system expects more fragments from the encoders (e.g., the live event is still in progress), then the system loops to block 340 to receive the next encoder fragment, else the system completes.

Figure 4:
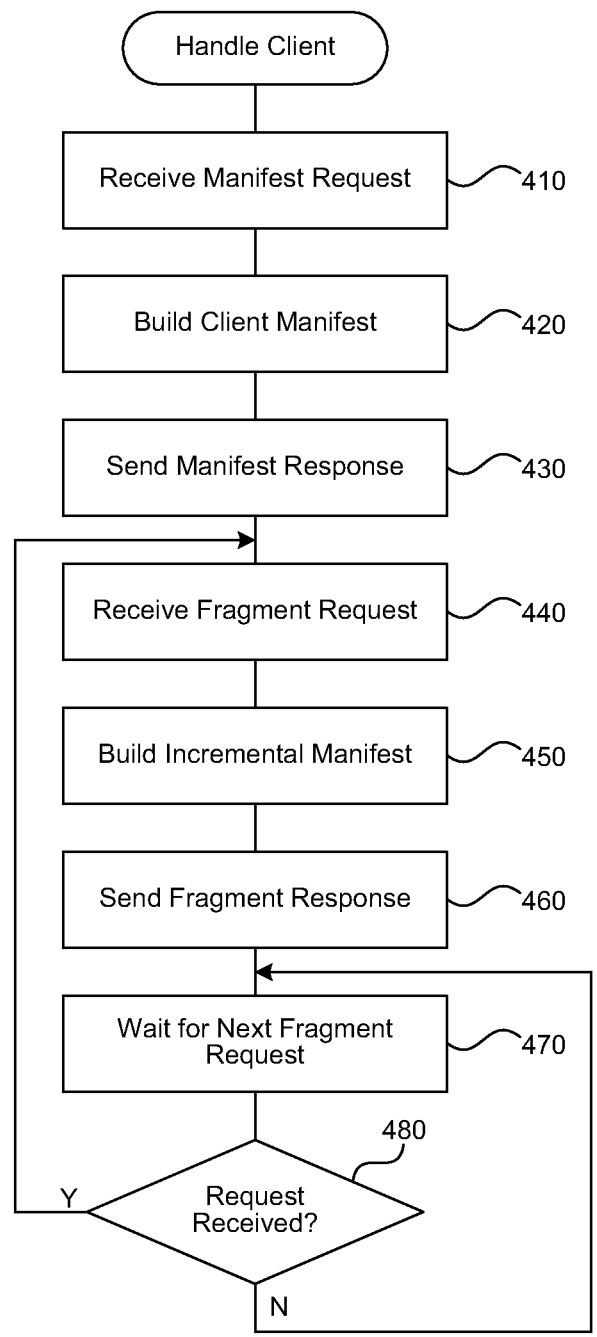
FIG. 4 is a flow diagram that illustrates the processing of the system to handle a client connection for streaming media, in one embodiment.

FIG. 4 is a flow diagram that illustrates the processing of the system to handle a client connection for streaming media, in one embodiment. Beginning in block 410, the system receives a manifest request from the client. For a live event, many clients may connect at the same time, but not all will connect at the start of the event. For example, if media fragments contain two seconds of data, and a client connects one minute into the event, there will already be 30 fragments available from the system. The client requests an initial manifest to determine the encodings of the event available from the system (determined by the encoders providing the system with data), and information about the then existing fragments. Note that the connection between server and client is stateless. The server does not typically dedicate any resources for a specific client. Rather, the server is listening for any incoming request, each request asks for a specific fragment or other information, and the server responds to the request and moves on to the next request without specifically tracking the state or history of any client's requests to the server.

Continuing in block 420, the system builds a manifest to satisfy the client request based on the fragments received and the encoder information received when the system initially requested encoder manifests. The client manifest includes a static portion that is a union of each of the encoder manifests that describes the available encodings, and a dynamic portion that describes media fragments received by the server from the encoders thus far. Continuing in block 430, the system provides the built client manifest to the client in response to the client request. In some embodiments, the request is a standard HTTP GET request and the response is an HTTP response (e.g., 200 OK). The system may provide a cache lifetime on the response so that subsequent client requests within a reasonable amount of time can be serviced by Internet caching infrastructure. However, because the dynamic portion of the manifest quickly becomes stale, the cache lifetime is short enough to avoid caching that would leave clients with too much stale manifest information. Based on the manifest, the client can begin requesting fragments in whichever encoding the client chooses. For example, the client may initially select a low bit rate encoding and select higher bit rate encodings for subsequent fragments until network bandwidth limits the client's ability to receive the fragments at a bit rate.

Continuing in block 440, the system receives a fragment request from a client. The client may identify that fragment by using a particular URL. The URL may identify a time of the fragment as well as an encoding. For example, the URL may be of the form "http://server/event.isml/QualityLevels (1500000)/Fragments (video=20000000)," where the QualityLevels parameter is a bit rate measured in bits per second, video is the name of the track being requested, and the value following "video=" is the time position in units of 100 nanoseconds (the scale of the unit depends on the way the presentation is encoded). Continuing in block 450, the system builds an incremental manifest by retrieving manifest information from the fragment data store and local index table that describes the requested fragment. The system may also include manifest information for one or more subsequent fragments in the incremental manifest as described herein.

Continuing in block 460, the system sends a response to the client fragment request that includes the requested media fragment and the built incremental manifest. Based on the initial manifest and each incremental manifest the client can build a local manifest that encompasses information about the entire media event. The manifest allows the client to quickly skip around and play back any location within the media event. Continuing in block 470, the system waits for the next fragment request. Continuing in decision block 480 if a new fragment request is received, then the system loops to block 440 to handle the fragment request, else the system loops to block 470 to continue waiting. After block 480, these steps conclude.

Note that in the steps described herein, the smooth streaming is not aware of the state of each client and does not track state for the clients. In fact, for a particular client it is possible that the client plays the entire media event without ever talking to the system. This is possible because the client may receive each requested manifest and media fragment from cache servers distributed throughout the network. Clients request the data they want based on factors such as a desired bit rate based on client-observed network conditions, or a desired location based on user interaction with client-displayed controls (e.g., fast forward, seek, rewind, and so forth). This allows the server to focus resources on other tasks and dramatically increases scalability. For well-attended live events, this means that many more viewers can watch the event.

Figure 5:
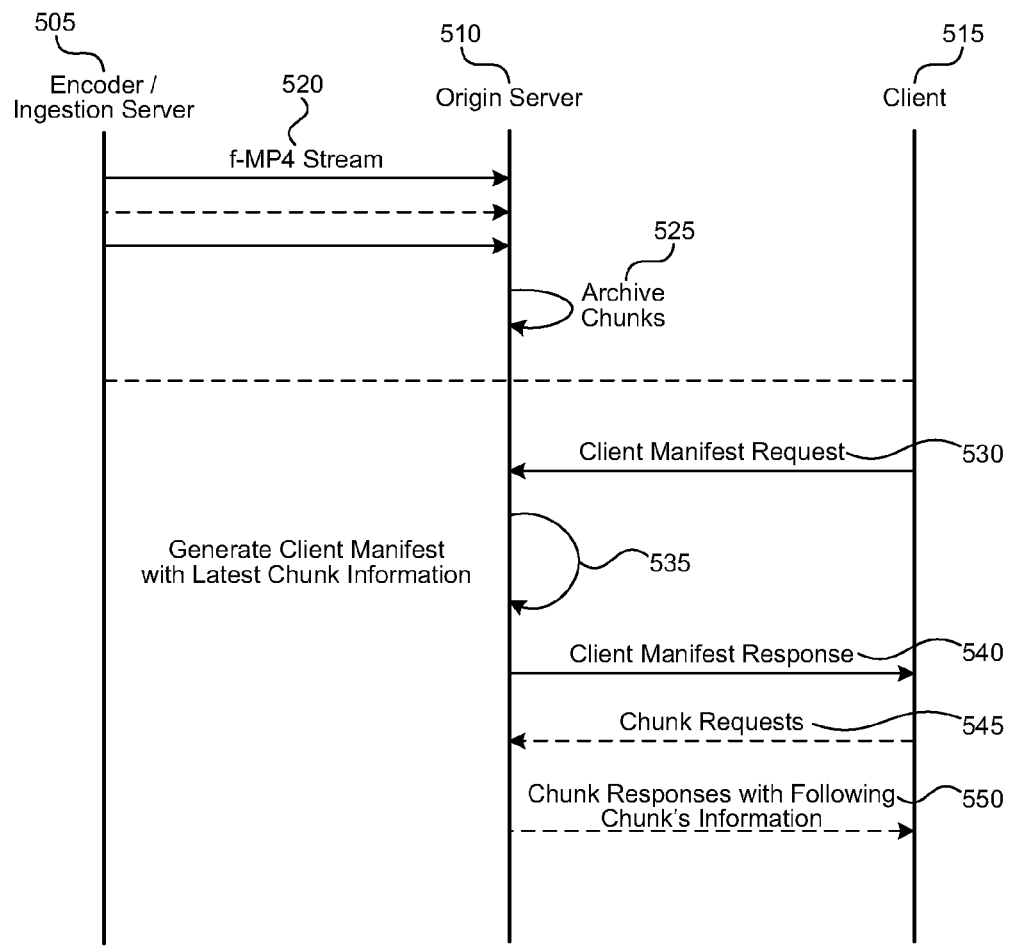
FIG. 5 is a data flow diagram that illustrates the flow of media fragments from an encoder to an origin server to a client, in one embodiment.

FIG. 5 is a data flow diagram that illustrates the flow of media fragments from an encoder to an origin server to a client, in one embodiment. The encoder 505 continuously provides media data 520 to the origin server 510 either directly or through an ingest server as described herein. The media data may include fragments of an MP4 stream based on a live event, for example. The origin server 510 archives 525 each media fragment, such as to a local data store. The origin server 510 receives a manifest request 530 from a client 515. The origin server 510 generates 535 a client manifest based on the latest media fragment information. The origin server 510 provides a client manifest response 540 to the client 515. The client 515 then sends one or more media fragment requests 545, and the origin server 510 responds 550 with the requested media fragment and potentially information about subsequent media fragments. The data flow on the left of the diagram continues for as long as the media event is taking place and the encoder 505 is providing new media data. The data flow on the right of the diagram continues for as long as clients 515 are requesting media fragments, which may occur during the media event and after the event as clients request on-demand viewing of the media event.

In some embodiments, the smooth streaming system provides digital video recorder (DVR)-like functionality for live media streams. In other words, users can pause a live stream, seek within the live stream, and so forth, without adding work or state tracking for the server. In a live stream, there are several scenarios like a missed scene, a pause to take a break, joining the event late and intending to watch from start, and so forth that are enabled by the system allowing the user to play media fragments in various orders and at various times. Based on the assembled manifest described herein, the system offers the user control over how they watch a live stream. These controls are available today with TV via a DVR. The smooth streaming system includes client controls to respond to user actions and manage playback of a live stream in a non-live mode by seeking to various locations in the manifest and requesting the appropriate media fragments. In addition, the client can switch between live and non-live viewing during playback.

In some embodiments, the smooth streaming system operates by providing the client with a web browser plug-in. For example, the system may provide the client with a Microsoft Silverlight application. Microsoft Silverlight receives references in web pages to applications contained in containers called XAP files. Microsoft Silverlight extracts the XAP file and invokes the application. Microsoft Silverlight provides applications with a sandboxed, secure environment in which to run so that a user's computer system is protected from malicious or erroneous application code. Microsoft Silverlight provides application programming interfaces (APIs) that applications can call to playback media in a way that shields the user's computer system and hardware from potentially harmful application actions. Thus, Microsoft Silverlight and other browser plug-ins can provide all of the functionality of a client environment in which the smooth streaming system expects to operate.

In some embodiments, the smooth streaming system provides logic for synchronizing related media streams. For example, a live audiovisual event may include one or more video streams (e.g., camera angles) and one or more audio streams (e.g., languages). As the client downloads the audio and video media fragments separately, the client plays the audio and video media content in sync by aligning the time information associated with each media fragment, as described further herein with reference to clock synchronization. The system may also synchronize other types of data, such as slides in a slide presentation, images, text, and so forth.

In some embodiments, the smooth streaming system provides streams that play at different rates to clients. For example, the server may include 2×, 5×, 0.5×, and other speeds of playback. The client can switch to a stream of a different rate to provide the appearance to the user that the media is fast-forwarding (e.g., 2×) or rewinding (e.g., 0.5×). To switch, the client simply requests a different media fragment, e.g., at a different URL. The client can smoothly switch between playing media fragments at the current rate and playing media fragments at a different rate by continuing to play the particular media fragments that are received. This provides a seamless experience to the end user with little latency between the user's request and the change in the media playback. This also saves network bandwidth as the client does not download, for example, two times the data to play media twice as fast, but rather downloads a reduced size encoding of the media that is encoded at the accelerated rate.

In some embodiments, the smooth streaming system provides highlight markers in the metadata. A highlight may include any interesting segment of media, such as a point during a sporting event during which a player scored a goal. The client can play a highlight reel after an event has concluded by playing those media fragments of the media with associated with highlight markers. If the client did not receive the live event, the client can request the manifest for the media and then request only those media fragments corresponding to the highlights. If a user wants to see more of the media before and after the highlight (e.g., as indicated by the user fast-forwarding or rewinding), then the client can request additional media fragments to play the requested portions of the media. Thus, the system may provide highlight information in the manifest for the client.

In some embodiments, the smooth streaming system supports inline advertising. For a live event, it may be unknown at the start of the event when commercial breaks will occur. An event coordinator may press a button during production when it is time for a commercial, causing the system to insert an advertising marker in the media stream metadata. When the client receives the advertising marker, the client may request and receive media fragments associated with a previously identified advertisement. For example, the system may provide a list of potential advertisements in an initial manifest. The advertisement may be provided in media fragments similar to other media, and may not be stored at the same server that provides the live event. Upon encountering an advertisement marker, the client pauses playback of the main stream, retrieves and displays the advertisement, and then resumes playback of the main stream.

In some embodiments, the smooth streaming system determines which encodings are available based on a subscription or other payment model. For example, a content provider may charge more for a high definition (HD) version of a live event than a standard definition (SD) version of the event. In this case, the system may enable or disable switching to particular bit rates based on whether the conditions of the payment model have been met (e.g., the user's account is current). This information may be included in the manifest provided to the client. The content provider may offer some encodings free, such as a low bit rate or highlight only media, while charging for others.

In some embodiments, the smooth streaming system provides failover for various components of the system. For example, the system may include redundant encoders, ingest servers, origin servers, and so forth. During an encoder failover, the server may append "StartTime(nnnn)" to the encoder URL where "nnnn" is the absolute timestamp of the last fragment the server successfully received. An example of the failover URL would be: "http://encoder:port/StartTime (12345678)." When using MP4 boxes, the backup encoder does not need to resend the "ftyp," "ManifestBox," and "moov'" boxes when it starts the stream. If encoder failover caused missing fragments, the server will return "404—File Not Found" if those fragments are requested by the client.

From the foregoing, it will be appreciated that specific embodiments of the smooth streaming system have been described herein for purposes of illustration, but that various modifications may be made without deviating from the spirit and scope of the invention. For example, although audiovisual data has been used in examples, other types of data can be used with the system including text (e.g., streaming stock quotes), slides (e.g., a presentation), and so forth. Accordingly, the invention is not limited except as by the appended claims.

We claim:

1. A computer-implemented method for providing streaming media from a server to a client, the method comprising:
receiving a manifest request from the client;
building a client manifest to satisfy the client request based on media fragments and encoder information the server has received, wherein the client manifest specifies one or more media fragments associated with a media event and wherein each media fragment is structured to be individually cacheable by a network cache server by providing a defined request format for each fragment for which any client using the defined format to request the fragment will receive the same response and wherein fragment requests for different encodings of the same streaming media map to the same point within a media presentation;

providing the built client manifest to the client in response to the manifest request;

receiving a fragment request from a client that identifies a particular media fragment;

building an incremental manifest by retrieving manifest information that describes the requested media fragment, the incremental manifest further comprising information for one or more media fragments received by the server subsequent to building of the client manifest;

sending a response to the client fragment request that includes the requested media fragment and the built incremental manifest;

wherein the preceding steps are performed by at least one processor and wherein the server provides media fragments to multiple clients without storing state information regarding each of the clients.

2. The method of claim 1 wherein the manifest request determines one or more encodings of an event available from the server and information regarding existing media fragments related to the event, wherein the available encodings comprise multiple bit rates of media associated with the event between which a client can select at any point during playback.

3. The method of claim 1 wherein there exist multiple encoders and wherein building a client manifest comprises parsing a server manifest from each encoder and merging received encoder manifests into the client manifest.

4. The method of claim 1 wherein the client manifest includes a static portion that is a union of each of multiple encoder manifests that describes available encodings, and a dynamic portion that describes media fragments received by the server from multiple encoders up to the point of the request in a manner that allows the client to start playback and respond to a seek by requesting one or more specific media fragments based on the client manifest.

5. The method of claim 1 wherein providing the client manifest comprises sending a cacheable HTTP response and wherein the cacheable HTTP response includes a cache lifetime based on a server-provided lifetime of the client manifest.

6. The method of claim 1 wherein the client can begin requesting fragments in one of multiple encodings based on the client manifest, and wherein the client can initially select a first low bit rate encoding and later requests fragments at a higher bit rate based on one or more detected conditions.

7. The method of claim 1 wherein the fragment request identifies a particular fragment by including a distinguished Uniform Resource Locator (URL) that identifies a time associated with the fragment and an encoding associated with the fragment.

8. The method of claim 1 wherein the client manifest and the incremental manifest allow the client to build a local manifest that encompasses information regarding a complete media event and to skip around and play back any location within the media event.

9. A computer system for delivering cacheable streaming media presentations, the system comprising:

a processor and memory configured to execute software instructions;

a register event component configured to receive information regarding a live media event for which the system will receive encoded media data;

an encoder interface component configured to provide an interface between the system and one or more encoders that provide the encoded media data as media fragments;

an index fragment component configured to create and maintain an index table of media fragments received from encoders, wherein each media fragment is structured to be individually cacheable by a network cache server by providing a defined request format for each fragment for which any client using the defined format to request the fragment will receive the same response and wherein fragment requests for different encodings of the same streaming media map to the same point within a media presentation;

a fragment data store configured to store received media fragments and the created index table of fragments to provide to clients based on received client requests;

a client interface component configured to receive client requests for media fragments and provide manifest data and media fragments to clients;

a build client manifest component configured to build a manifest to satisfy a client request that includes information regarding each of the encodings available from the system and fragments stored by the system up to a time of the request, wherein the build client manifest component is further configured to provide an incremental manifest to include with each requested media fragment, wherein the incremental manifest provides information to the client regarding the current media fragment and information for one or more media fragments received by the system subsequent to building of client manifest; and a clock synchronization component configured to synchronize the clocks of the system, clients, and encoders.

10. The system of claim 9 wherein the register event component is further configured to receive identifiers for each of multiple encoders that will supply encoded media data to the system.

11. The system of claim 9 wherein the encoder interface component receives pushed media data from the encoders through HTTP POST requests.

12. The system of claim 9 wherein the encoder interface component receives encoded media data in a media container that includes boxes for media information and media metadata.

13. The system of claim 9 wherein the index fragment component is further configured to keep track of which media fragments have been received and from which encoders based on a time stamp associated with each media fragment.

14. The system of claim 9 wherein the client interface component is further configured to receive an initial manifest request from a client connecting to the system, invoke the build client manifest component to create a client manifest that includes information regarding the encodings available from the system and fragments stored by the system up to a current time based on the index table, and provide the client manifest to the client.

15. The system of claim 9 wherein the build client manifest component is further configured to provide the client with a count of subsequent fragment that the client can expect with each media fragment as a timing hint for the client.

16. A computer-readable storage device comprising instructions for controlling a computer system to receive encoded media fragments from one or more encoders, wherein the instructions, when executed, cause a processor to perform actions comprising:

receiving an event registration that describes a media event for which the system will receive media data from one or more encoders;

requesting a manifest from each registered encoder that describes the media data available from the encoder;

receiving an encoder manifest from each encoder, wherein the encoder manifest specifies one or more media fragments associated with a media event;

for each of a plurality of media fragments:

receiving a media fragment from an encoder, wherein each media fragment is structured to be individually cacheable by a network cache server by providing a defined request format for each fragment for which any client using the defined format to request the fragment will receive the same response and wherein fragment requests for different encodings of the same streaming media map to the same point within a media presentation;

indexing the received media fragment and adding the index information to an index table that catalogs the available media fragments;

archiving the received media fragment by storing the fragment and index information in a data store from which the fragment and index information can later be retrieved to satisfy client requests; and building a server manifest that includes information regarding a media event of which the media fragments are a part by adding information regarding the received fragment to the manifest.

17. The device of claim 16 further comprising, for each received encoder manifest, merging the manifests of the encoders together and storing the merged manifest for later retrieval by clients to identify the media encodings that the system can provide.

18. The device of claim 16 wherein the received media fragment includes a timestamp and an identifier of the encoder that encoded the media fragment, and wherein the system uses the timestamp associated with the media fragment to correlate media fragments produced in parallel by different encoders.

* * * * *